Aug. 4, 1970  T. A. RICH  3,522,425
APPARATUS FOR SELECTIVE SEPARATION OF IONS OF DIFFERENT
MOBILITIES IN A GAS STREAM
Filed Nov. 28, 1967
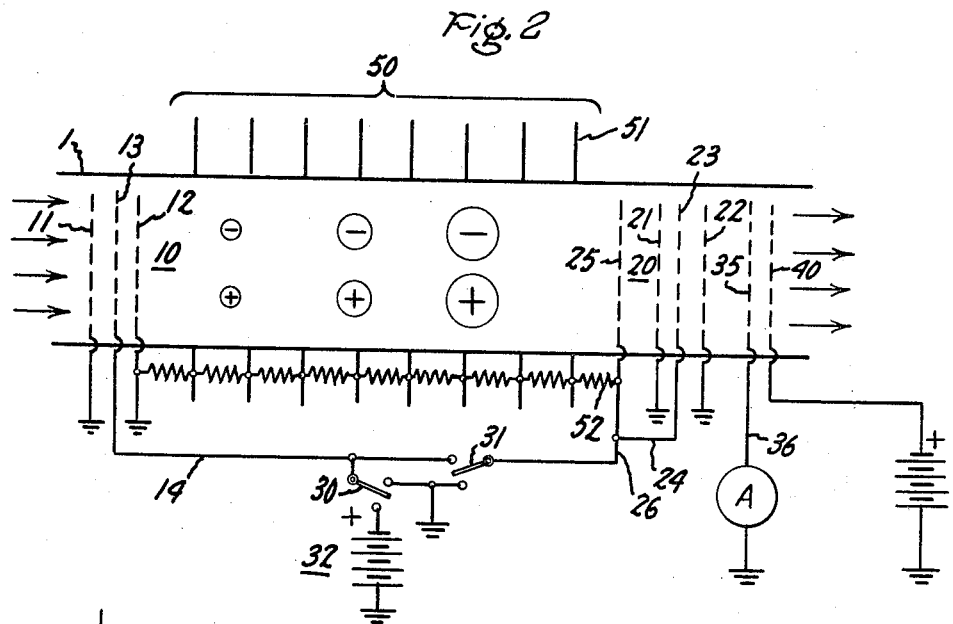
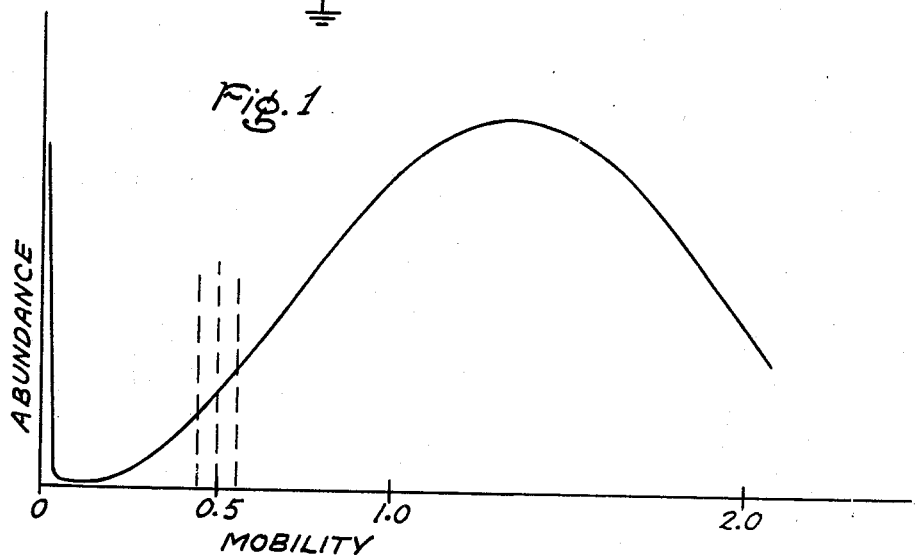
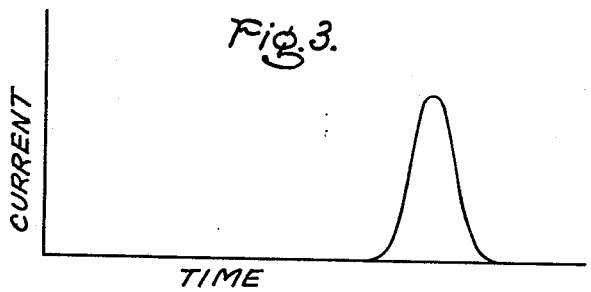
Inventor:
Theodore A. Rich,
by John M. Davis
His Attorney.

United States Patent Office 3,522,425
Patented Aug. 4, 1970

3,522,425
APPARATUS FOR SELECTIVE SEPARATION OF IONS OF DIFFERENT MOBILITIES IN A GAS STREAM
Theodore A. Rich, Scotia, N.Y., assignor to General Electric Company, a corporation of New York
Filed Nov. 28, 1967, Ser. No. 686,146
Int. Cl. H01j 39/34
U.S. Cl. 250—41.9                                                     7 Claims

ABSTRACT OF THE DISCLOSURE

An apparatus and method of operation thereof is disclosed whereby ions of a particular mobility, may be selectively separated from ions of different mobilities in a gas stream and their abundance measured. This is accomplished by isolating an ion bearing sample of gas in a conduit through which the gas flows at a predetermined rate and applying a predetermined electric field thereupon so that ions of the desired mobility are retained while ions of different mobilities are removed, then discharging the retained ions and measuring the thus obtained current pulse.

---

The invention described herein was made in the course of or under a contract with the Department of the Army.

BACKGROUND OF THE INVENTION

The present invention relates to a new and improved ion detector and, more particularly, to a detector capable of selectively detecting ions of a narrow range of mobilities in a gas such as air and giving an indication or measurement of their relative abundance and is particularly adapted for the measurement of the small ions of atmospheric physics.

In the examination of the ion content of a gas such as air, for example in air pollution studies, it is frequently desired to determine the relative abundance of ions having a relatively narrow range of mobilities, which may be related to their size or composition. In this respect, mobility of these ions may be defined as the velocity of an ion in centimeters per second in a unit field.

The previously available detectors have not been capable of as sharp discrimination as desired.

It is therefore a principal object of this invention to provide an apparatus for selectively measuring the relative abundance of ions having a narrow range of mobilities in a gas.

It is a further object of this invention to provide a method of operation for such an apparatus whereby the relative abundance of ions having a selected narrow range of mobilities may be measured.

Other and specifically different objetcs of the invention will become apparent to those skilled in the art from the following disclosure in conjunction with the accompanying drawings.

SUMMARY OF THE INVENTION

Briefly stated, and in accordance with one aspect of the invention, a gas containing ions of a wide range of mobilities is passed through a conduit which includes a pair of spaced ion collector gas-permeable members, a gas-permeable electrode member located between the collectors but adjacent to the downstream detector member, a gas-permeable ion collector electrode associated with a current measuring means located adjacent to and downstream of the downstream collector member of the first mentioned pair of collector members, and a gas-permeable retarding electrode located adjacent to and downstream of the current measuring electrode. Initially, all of the gas-permeable collector and electrode members are at ground potential. It will be understood that by "gas-permeable" it is meant that these various elements and members which are so-characterized do not restrict the flow of the gas through the conduit which contains them. For convenience, the pair of spaced particle collector members will be referred to as the "upstream gate" and the "downstream gate," with respect to the direction of gas flow.

In making a measurement, both gate members are closed, in that while the air flow continues at the constant rate, no new ions are admitted to the space in the conduit between the gate members. Simultaneously, an electric field of a predetermined strength is applied between the electrode adjacent the downstream gate but upstream thereof and the downstream electrode of the upstream gate such that the first electrode is at a positive potential and the gate electrode is grounded. All of the negatively charged ions in the gas between the gates will be accelerated downstream and be collected by the positive electrode or by the downstream gate. The field between the positive potential electrode and the grounded electrode of the upstream gate will exert a retarding force on the positively charged ions which will result in those ions having the higher mobilities being driven upstream where they are collected by the grounded electrode of the upstream gate. Those ions having the lower mobilities are carried by the gas flow downstream against the retarding field to pass through the gas-permeable positive potential electrode and are collected by the downstream gate. Those ions having a positive charge and the desired intermediate mobility range will be held in the space between the gates in a more-or-less meta-stable condition. In other words, depending upon the gates velocity and the distance between the gates, ions having mobilities extending over a range of mobilities above and below a single desired mobility value which is determined by the gas flow rate and the particular field strength will be trapped between the electrodes. Those having higher mobilities than the previously mentioned single mobility and located farther downstream from the upstream gate will take longer to move upstream to be collected than those of the same mobility located nearer the upstream gate. Those ions having lower mobilities than the single desired mobility will be carried by the gas stream against the field toward the downstream gate to be collected at a rate which will depend upon their individual mobilities, and the time required to remove ions of either higher or lower mobilities from the space between the gates will depend upon the degree of the difference of the ion's mobilities from the single desired mobility and the distance of the ion from its respective collector. After a period of time has elapsed, the only ions remaining between the gates are ions having a narrow band of mobilities extending above and below the single desired mobility. The longer the time period, the narrower this band of mobilities becomes.

After sufficient time has elapsed, the field is removed, the lower gate is opened and a positive potential is applied to the electrode downstream of the current measuring electrode which is of sufficient magnitude to repel ions having the desired mobility to the current collecting electrode. All the remaining ions are swept by the gas flow through the grounded potential electrode and downstream gate where they are collected by the current measuring electrode and discharged thereby. Any ions which pass through the gas-permeable current measuring electrode are repelled by the positive potential and driven back to be collected by the current measuring electrode. The substantially simultaneous collection and discharge of these ions of selected mobility results in a pulse of current delivered to the current measuring apparatus over a short period of time, the magnitude of which is related to the abundance of positively charged ions having a narrow range of mobilities about the single desired mobility.

BRIEF DESCRIPTION OF THE DRAWINGS

The more detailed description of the invention which follows will be better understood when read in conjunction with the accompanying drawings in which:

FIG. 1 is a graphical representation of the distribution of the abundance of ions having mobilities up to a mobility of about 2;

FIG. 2 is a schematic illustration of a preferred embodiment of the invention; and FIG. 3 is a graphical representation of the nature of the current pulse produced when the ions of selected mobilities are collected and discharged.

More specifically, FIG. 1 illustrates a typical distribution of the abundance of ions in a gas such as air versus their relative mobilities. The sharply rising portion of the curve at lower mobilities represents particles approaching dust particles in size, while the right hand portion of the curve between mobilities greater than about 0.2 represents the small-ion mobility range for which this invention is particularly useful. The vertical dashed lines illustrate a useful range in mobilities about a single selected mobility of 0.5 for such ions which the apparatus of this invention may be employed to detect and measure, it being understood that this particular selected mobility and the width of the range as shown are merely exemplary and are not to be considered as limiting in any manner.

One preferred embodiment of the invention is schematically illustrated in FIG. 2, wherein an elongated conduit 1 of a material having a relatively high electrical resistivity and having a uniform cross-sectional area and configuration, which is preferably circular, which provides means through which a constant flow of a gas to be measured may be passed, as shown by the arrows at the ends of the conduit, in a left to right direction. An upstream gate 10 is supported in the conduit as shown and is comprised of a pair of parallel grounded electrodes 11 and 12 which are supported in spaced parallel relationship on either side of an electrode 13, which is connectable to an external circuit by lead 14. A similar gate 20 is provided downstream of gate 10 and includes grounded electrodes 21 and 22 and the intermediate electrode 23 is provided with a lead 24.

A high potential electrode 25 is supported by the conduit adjacent to and upstream of gate 20, and is connectable to an external circuit by lead 26 to which lead 24 connects.

Lead 14 is connected to a two position switch 30 and lead 26 is connected to a two position switch 31 as shown, whereby leads 14 and 26 may be selectively (a) connected to each other through switch 31 and alternatively to a DC power supply 32 or to ground by switch 30, or (b) leads 24 and 26 may be grounded by means of switch 31 while lead 14 is connected to the power supply 32 through switch 30. It should be noted that switch 31 and its function may be eliminated if desired.

Downstream of gate 20 and in spaced parallel relationship thereto is a collecting and current measuring electrode 35 which is provided with a lead 36 to an externally located conventional current measuring apparatus A through which current may pass from electrodes 35 to ground, as shown.

A positive potential electrode 40 is supported in the conduit in spaced parallel relationship to and downstream of electrode 35. Electrode 40 is connected to a source of DC potential.

It will be understood that all the electrodes described are gas-permeable electrically conductive membranes having substantially the same area and configuration as the interior of the conduit 10 and preferably are comprised of fine mesh metal screening but which do not appreciably reduce the rate of air flow through the conduit and in fact contribute to maintaining uniform gas velocity across the conduit.

A conventional voltage divider 50 is provided which comprises a plurality of spaced circumferential conductive plates interconnected by resistors 52 and terminally connected to lead 26 and to grounded electrode 12, as shown, to provide a relatively uniform field gradient between upstream gate 10 and the potential electrode 25.

As an example of a typical measurement utilizing the present invention, assume that it is desired to measure ions having a mobility of about 0.5 centimeter per second per volt per centimeter in air flowing through conduit 10 at 25 centimeters per second and that the distance between grounded electrode 12 of gate 10 and the potential electrode 25 is 12.5 centimeters. Under these conditions, ions in the air stream will pass from electrode 12 to electrode 25 in 0.5 second when all the electrodes are at ground potential. Continuity between leads 14 and 26 is established by closing switch 31 and switch 30 connects these leads to DC power supply 32 and a positive potential is applied to electrodes 13, 25 and 23, while electrodes 11, 12, 21 and 22 remain at ground potential. At this time, no additional ions may pass into conduit 1 through gate 10 since a large field gradient is present between electrodes 11 and 13 such that all incoming positively charged ions will be collected by electrode 11 and all incoming negatively charged ions will be collected by electrode 13. If a positive potential of 625 volts is applied to electrode 25, there will be a field of 50 volts per centimeter in the region between electrodes 12 and 25. In such a field in still air a positively charged ion with a mobility of 0.5 centimeter per second per volt per centimeter would move toward electrode 12 with a velocity of 25 centimeters per second. This, however, is the velocity, in the opposite direction, of the air stream so that such an ion would tend to remain stationary in the space between electrodes 12 and 25. Assume that the sample contained between the upstream gate 10 and the electrode 25 initially contained both positive and negative ions of a broad band of mobilities. For simplicity, assume the small diameter circles at the left of the chamber in FIG. 2 represent ions having higher mobility than 0.5, that the intermediate size circles represent ions with a mobility of 0.5, and the large diameter circles represent ions having a mobility less than 0.5. The positive ions of higher mobility will be moved upstream by the field and collected by electrode 12, the positive ions having a mobility of 0.5 will be held in place and the positive ions having mobilities less than 0.5 will be carried by the air stream against the field through electrode 25 and collected by electrode 21 of gate 20. All negative ions will move to electrode 25 and be collected at that point. After an appropriate time interval, the potential is removed from electrodes 25 and 23 permitting the remaining ions which have mobilities in a band about 0.5 to be carried through electrode 25 and gate 20 by the air stream and collected and discharged by electrode 35 producing a current pulse such as shown in FIG. 3 which is detected and measured by the current measuring apparatus A. A positive potential which may be of the order of about 150 volts is applied to electrode 40 to prevent any positive ions from being carried through electrode 35. During the measuring portion of the operation when electrodes 25, 21, 22 and 23 are at ground potential, upstream gate 10 may be kept closed by leaving switch 30 connected to positive potential source 32 while connecting lead 26 to ground through switch 31.

However, ideally the incoming air has a uniform velocity across the conduit, i.e. when gate 10 is opened the incoming ions will advance as a plane front. If, in a cyclic operation of the apparatus, the gates are opened and closed before the ions in the new sample can reach the current collecting electrode and preferably before they reach the potential electrode 25, switch 31 may be eliminated.

If, under the conditions previously assumed, the gates are open for nearly 0.5 second and then closed, the space between electrodes 12 and 25 is nearly filled with the ion bearing new air sample, but none reach the potential electrode 25 or the current collecting electrode 35. If the gates are energized and electrode 25 is at a positive potential of 625 volts for one second, positive ions of a mobility of 0.75 or greater will be forced against the air flow to upstream gate 10 regardless of their location in the conduit between electrodes 12 and 25 when the voltage was applied. Positive ions with a mobility of less than 0.5 will move toward electrode 25 at somewhat less than the air velocity. For example, an ion of 0.25 mobility will move toward electrode 25 with a velocity of 25−12.5=12.5 centimeters per second and if the potentials are applied for one second, all positive ions of this mobility or less will be removed from the zone between electrodes 12 and 25. Thus, only positive ions with mobilities between 0.25 and 0.75 will remain between the gates after one second. Obviously, if the potentials are maintained for longer periods of time, the width of the band of mobilities will be decreased.

While the foregoing disclosure and specific example has been directed to the measurement of positive ions, it will be apparent that negative ions may be similarly measured by merely reversing the sign of the applied potentials.

It will be apparent to those skilled in the art that any convention gas pumping means, preferably located downstream of potential electrode 40 may be employed provided it is capable of producing a constant, controllable gas velocity through the conduit 1. Since such pumps are commercially available, no particular pump means has been illustrated.

Furthermore, while certain of the electrodes have been disclosed as connectable or connected to ground, it will be apparent to those skilled in the art that a relatively low reference potential may be used instead of ground potential.

From all the foregoing it will be apparent to those skilled in the art that many minor changes may be made in the specific form of the apparatus disclosed for purposes of illustration. It is therefore not intended that the scope of the invention be limited in any way except as set forth in the appended claims.

What I claim as new and desire to secure by Letters Patent of the United States is:

1. An apparatus for measuring the abundance in a gas of ions having mobilities substantially equal to a preselected value comprising
   a conduit;
   means for passing a stream of an ion containing gas through said conduit at a constant known velocity;
   means for selectively blocking the flow of ions in said conduit without impeding the flow of said gas stream;
   means for maintaining ions having mobilities substantially equal to said preselected value substantially stationary in said gas stream when said ion blocking means is operative;
   means cooperable with said ion blocking means and said ion maintaining means for removing ions having mobilities different from said preselected value from the gas stream in the zone wherein said selected stationary ions are located; and
   means for collecting said selected ions and determining their abundance.

2. The apparatus recited in claim 1 wherein said means for selectively blocking the flow of ions includes a pair of gas permeable electrically activated gate means in said conduit and longitudinally spaced apart at upstream and downstream locations with respect to the direction of the flow of said gas stream to define a chamber therebetween, said gate means being selectively connectable to a reference potential to permit free passage of gas and ions therethrough, and alternatively to a source of direct current potential to permit free passage of gas but to prevent passage of ions therethrough.

3. The apparatus recited in claim 2 wherein said means for maintaining ions having said preselected mobilities substantially stationary in said gas stream comprises a gas permeable electrode in said chamber adjacent to said downstream gate means.

4. The apparatus recited in claim 2 wherein each of said gate means comprises three spaced gas permeable electrode members, the outer two of which are connected to said reference potential and the intermediate member being selectively connectable to said reference potential and alternatively to said source of direct current potential.

5. The apparatus recited in claim 4 wherein said means cooperable with said ion blocking means and said ion maintaining means includes the reference potential electrode of each gate means defining said chamber.

6. The apparatus recited in claim 4 wherein said means for collecting said selected ions includes a first gas permeable electrode connected to said reference potential in said conduit downstream of said downstream gate means which includes means for measuring electrical current and a second gas permeable electrode adjacent to and downstream of said first gas permeable electrode.

7. The apparatus recited in claim 6 which includes electrical circuit means for applying electrical potentials of the same size to said intermediate member of said gate means and to said second electrode of said collecting means.

References Cited

UNITED STATES PATENTS 2,950,387  8/1960  Brubaker _____ 250—41.9

WILLIAM F. LINDQUIST, Primary Examiner

A. L. BIRCH, Assistant Examiner

U.S. Cl. X.R.

55—2, 101